United States Patent [19]

Menges et al.

[11] 4,372,898

[45] Feb. 8, 1983

[54] PROCESS OF CROSSLINKING ELECTRICAL INSULATORS OF PLASTIC OR RUBBER

[75] Inventors: George Menges, Aachen-Laurensbert; Klaus Kircher, Aachen-Richterich; Bernd Franzkoch, Aachen Stettiner, all of Fed. Rep. of Germany

[73] Assignee: Paul Troester Maschinenfabrik, Fed. Rep. of Germany

[21] Appl. No.: 173,190

[22] Filed: Jul. 25, 1980

Related U.S. Application Data

[63] Continuation-in-part of Ser. No. 6,778, Jan. 26, 1979, abandoned.

[30] Foreign Application Priority Data

Jan. 26, 1978 [DE] Fed. Rep. of Germany ....... 2803252

[51] Int. Cl.$^3$ ............................................. B29C 13/04
[52] U.S. Cl. ........................................ 264/22; 264/25; 264/26
[58] Field of Search ............................. 264/25, 26, 22

[56] References Cited

U.S. PATENT DOCUMENTS

| | | | |
|---|---|---|---|
| 2,972,780 | 2/1961 | Boonstra | 264/26 |
| 3,449,213 | 6/1969 | Knapp et al. | 264/25 |
| 3,513,228 | 5/1970 | Miyauchi et al. | 264/25 |
| 3,660,552 | 5/1972 | Hinz et al. | 264/25 |
| 3,701,702 | 10/1972 | Shichman et al. | 264/25 |
| 3,755,519 | 8/1973 | Myers et al. | 264/26 |
| 4,049,757 | 9/1970 | Kammel et al. | 264/25 |
| 4,102,955 | 7/1978 | Baker | 264/25 |

FOREIGN PATENT DOCUMENTS 2611349 9/1977 Fed. Rep. of Germany .

*Primary Examiner*—James H. Derrington
*Attorney, Agent, or Firm*—Robert E. Burns; Emmanuel J. Lobato; Bruce L. Adams

[57] ABSTRACT

Curing of plastic material or rubber for use as electrical insulation is effected by mixing with the plastic or rubber composition 0.1 to 25 weight percent of a crosslinking agent and subjecting the resulting mixture to a UHF electric field. The crosslinking agent used has the characteristic of being excited by the UHF electric field to produce radicals which effect crosslinking of the plastic or rubber composition and of decomposing or combining with the plastic or rubber in the crosslinking process to form decomposition or reaction products which are not excited by an alternating current electric field. Hence, the crosslinking agent does not adversely affect the electrical insulating characteristics of the crosslinked material even when used for insulating alternating current circuits. The composition is free of conventional fillers such as carbon black which retain their electrical activity.

17 Claims, 10 Drawing Figures

TERTIARY-BUTYL-PERBENZOAT (TBPB)

1) PEROXIDE MOLECULE         PE  CHAIN MOLECULE $R_1\text{-}O\text{-}O\text{-}R_2$
$+\Delta E$

2) RADICAL FORMATION $R_1\text{-}O^\cdot,\ R_2\text{-}O^\cdot$

3) HYDROGEN EXTRACTION $R_1\text{-}OH,\ R_2\text{-}OH$

4) CHAIN RECOMBINATION $R_1\text{-}OH,\ R_2\text{-}OH$

PROCESS OF CROSSLINKING ELECTRICAL INSULATORS OF PLASTIC OR RUBBER

REFERENCE TO PRIOR APPLICATION

This application is a continuation-in-part of our application Ser. No. 6,778 filed Jan. 26, 1979, now abandoned.

FIELD OF THE INVENTION

The present invention relates to a process of crosslinking plastic or rubber material that is to be used for electrical insulation.

BACKGROUND OF THE INVENTION

Plastic insulating materials are used for example in the cable industry. Such plastic materials have heretofore been cured by adding a crosslinking agent which, under the influence of high temperature, breaks down to form radicals which initiate the crosslinking. Because of the poor heat conductivity of the insulation, a long time is required to bring the cable insulation to the proper high temperature and this requires a long length of cable to hang unsupported in the heating zone in order to avoid deforming the insulation. This necessitates a high equipment expense. Moreover, this process has the disadvantage that the crosslinking is not uniform throughout the insulation as the heat penetrates the insulation from the outside and hence the crosslinking is not initiated simultaneously throughout the entire insulation cross section. This disadvantage can unfavorably influence the electrical properties of the insulation.

In German Pat. No. 26 11 349 there is disclosed a process of crosslinking plastic material in which the crosslinking process of a plastic material which is not excitable in an alternating electric field is initiated through the reaction of a composition which is unstable in an alternating electric field. In this process the decomposition of the crosslinking agent into radicals is effected not through warming the entire mass but through the use of a radical source which by reason of its special composition is excitable by the energy of an alternating current field and can thereby initiate the crosslinking process in that it, for example, decomposes into radical components which effect the crosslinking.

Such crosslinking agents are for example certain peroxides or systems of radical sources with substances which transfer the energy from an alternating current field to the radical donor. The substances or mixtures heretofore used have the expected characteristic that after completion of the crosslinking process they still retain a large part of their activity in an alternating current field. Thus after the crosslinking process, the plastic material has the characteristic of being inductive in an alternating current field. For example, the crosslinking agent may comprise a mixture of a peroxide such as di-t-butylperoxide which is not excitable with an excitable additive such as tri-allyloxi-s-triazine, special carbon black or halogenated hydrocarbon (chlorinated paraffin). The plastic material produced by this method has poor insulation characteristics.

SUMMARY OF THE INVENTION

The present invention has recognized that the poor insulation characteristics of the plastic material were due to the fact that the crosslinking agent or system of crosslinking agents with an active additive have retained their active molecules unaltered. The crosslinking system incorporated in the unexcitable plastic material is excited in the alternating current electric field and leads to a crosslinking of the plastic material but the active molecules or molecule groups remain unaltered in their activity. These are, in the above-mentioned examples, the carbon black and halogenaed hydrocarbon whose activity in all cases is influenced by nonessential side reactions and the tri-allyloxi-s-triazine whose activity on the hetrocyclic ring in the molecule can be restored which, by a participation of the allyl group in the reaction on the radical, is likewise not altered.

Other examples of crosslinking agents which also, after successful crosslinking of the plastic, lend bad insulation characteristics are crosslinking agents with functional groups which are responsible for excitation of the crosslinking agent in an alternating current field but which do not lose their activity through the excitation. Such for example are cross-linking agents with halogen atoms or nitro-groups. The reaction products are either grafted onto the polymer chain or remain in unaltered form in the plastic material. In all cases there remains a molecule group which is excitable in an alternating current electric field and, while not able to renew a crosslinking, yet leads to poor insulation characteristics.

The invention is based on the realization that it is possible to produce plastic material usuable as a high value insulator by using as an active additive for crosslinking of the electrically inactive plastic material a composition of which the electrical activity is destroyed by the effect of a high frequency alternating current electric field.

It is the problem of the invention to provide a process for carrying out an extraordinarily rapid crosslinking of plastic or rubber in a UHF alternating current electric field by means of an active agent which loses its activity in the crosslinking process and does not adversely affect the electrical insulating characteristics of the plastic or rubber in the finished product.

In accordance with the invention, the plastic material or rubber is mixed with an additive which is excitable with high energy absorption in an ultra-high frequency alternating current electric field and through this excitation is rapidly and fully converted into an electrically inactive material or combines with the plastic and/or rubber to form an electrically inactive material.

DESCRIPTION OF THE INVENTION

The invention thus uses for carrying out the crosslinking of an electrically inactive plastic material or rubber in an alternating current electric field, a crosslinking agent or crosslinking system that is excitable by treatment in a UHF alternating current electric field and which by treatment in such alternating current electric field is fully decomposed or converted and whose decomposition or conversion products after treatment in the alternating current electric field are so inactive that they do not adversely affect the electrical insulation characteristics of the plastic material or rubber.

Figure 2:
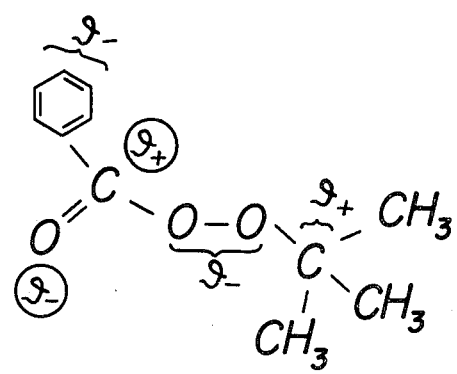
FIG. 2 is a graphic illustration of the structure of a crosslinking agent, namely t-butylperbenzoate.

By the use of a crosslinking agent of this kind, for example through the use of t-butylperbenzoate, the structure of which is shown schematically in FIG. 2, there is obtained a crosslinked plastic, the electrical characteristics of which are not adversely affected by the crosslinking additive and which is outstandingly suitable for use as an electrical insulator.

In FIG. 2, the encircled partial charges represent the greatest part of the polarity. Through the use of this crosslinking agent or peroxides of analagous composition, there is obtained at the same time the advantage that the crosslinking is effected simultaneously and uniformly throughout the entire cross section of the plastic material in the shortest period of time so that the length of the crosslinking zone and hence the length of a cable that must hang unsupported can be very short. The process in accordance with the invention thus makes it possible to produce outstanding electrical insulation with limited equipment expense.

Figure 1:
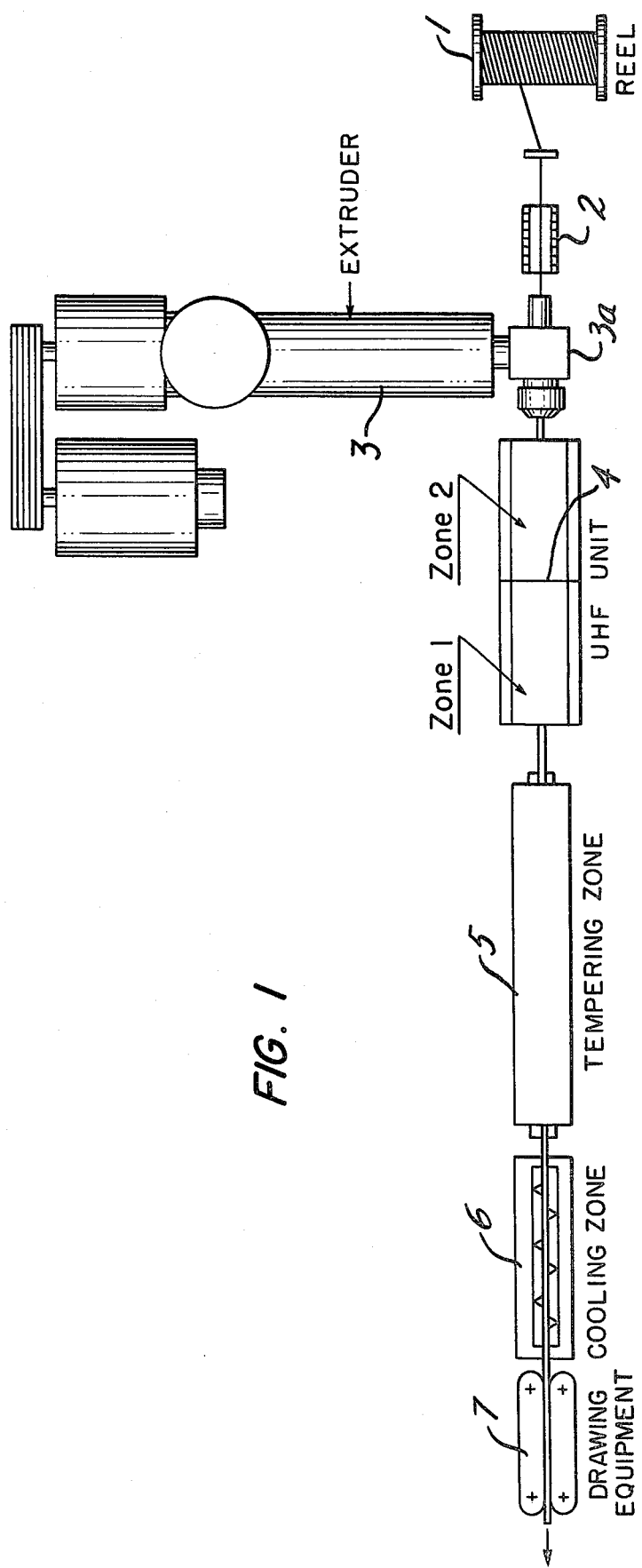
FIG. 1 is a schematic illustration of apparatus for carrying out the process of the present invention.

Apparatus for carrying out the process of the present invention is illustrated by way of example in FIG. 1. The apparatus is shown as comprising a reel 1 from which an electrical conductor is fed, a preheater 2 for the conductor, an extruder 3 for extruding a covering of rubber or plastic material on the conductor as it passes through the extruder head 3a, a UHF unit 4 for applying ultra-high frequency alternating current energy to the coated conductor, a tempering zone 5, a cooling zone 6 and drawing equipment 7 shown schematically as comprising two opposed belt conveyors. An electrical conductor which is to be covered with insulating material in accordance with the present invention is drawn off of the reel 1, passes through the preheater 2 and then through the head 3a of the extruder 3 where it is covered with rubber or plastic material mixed with a crosslinking agent. The covered conductor then passes through the UHF unit 4 where it is subjected to a UHF field directly after extrusion of the covering material by the extruder. The UHF unit comprises a cavity resonator or wave guide by which the ultra-high frequency electrical energy is applied to the covered conductor. It is shown as comprising two zones, each of which is fed with microwave energy of between 1.2 and 6 kw. Additional zones can be used if it is desired to increase the speed of production of the apparatus. After passing through a tempering zone 5, the covered conductor is cooled in the cooling zone 6, for example by air or liquid.

Figure 3:
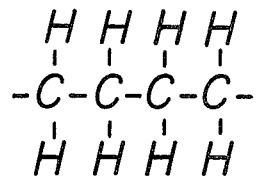
FIG. 3 is a graphic illustration of the crosslinking process.
Figure 3:
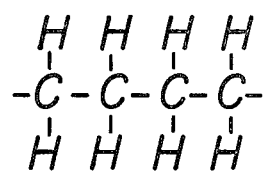
Figure 3:
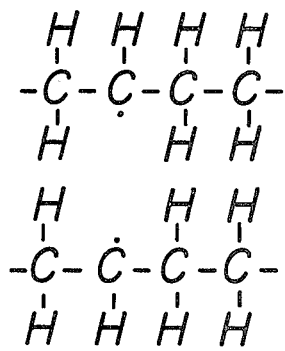
Figure 3:
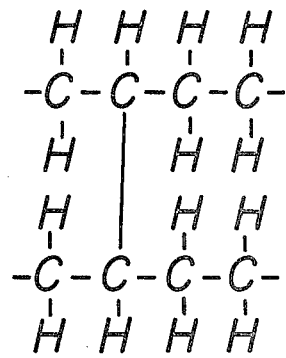

FIG. 3 illustrates schematically the crosslinking process. Step 1 illustrates starting with a peroxide molecule and a polyethylene chain molecule. Step 2 illustrates the formation of radicals by the action of UHF energy on the peroxide molecule. In step 3 hydrogen is extracted from polyethylene molecules which are thereupon crosslinked as illustrated in step 4.

If crosslinking of a formed part is to be carried out in an ultra-high frequency field starting at room temperature, a crosslinking time of about 3 to 5 minutes is necessary, whereby a part of the peroxide decomposes uncontrolled. With an addition of 5 weight percent of peroxide, a 95% degree of crosslinking can be effected.

If the formed part at higher than room temperature is subjected to the UHF field, a shorter crosslinking time can be used. For the crosslinking of polyethylene at a temperature below the softening point and thus where the polyethylene is form-stable there is a series of possibilities. The plastic material can be crosslinked in the form of individual pieces such as are produced by an extrusion machine if the formed plastic pieces are brought into the UHF field directly after extrusion from the die of the extruder. However, the plastic material can also be crosslinked as a band or strip provided that the extruder is provided in its head piece with an extrusion dye for forming a band or strip.

The process in accordance with the invention is of particular interest where the plastic or rubber composition to be crosslinked is wholly nonpolar and hence is not heated in a UHF field through absorption of energy and conversation of this energy into heat. Moreover, the plastic or rubber composition is free of all electrically active material which retains its electrical activity after subjection to the UHF electric field. Thus, in the process of the present invention, conventional fillers such as carbon black are not used.

The carrying out of the process in accordance with the present invention can in general be divided into the following steps:

(a) Production of the mixture to be crosslinked comprising polymer material and the crosslinking agent together with additives such as stress tabilizers and inhibitors for preventing premature decomposition of the crosslinking agent.

(b) Forming the resulting mixture into the desired form, and (c) Effecting crosslinking of the formed polymer material in an ultrahigh frequency alternating current field.

Figure 4:
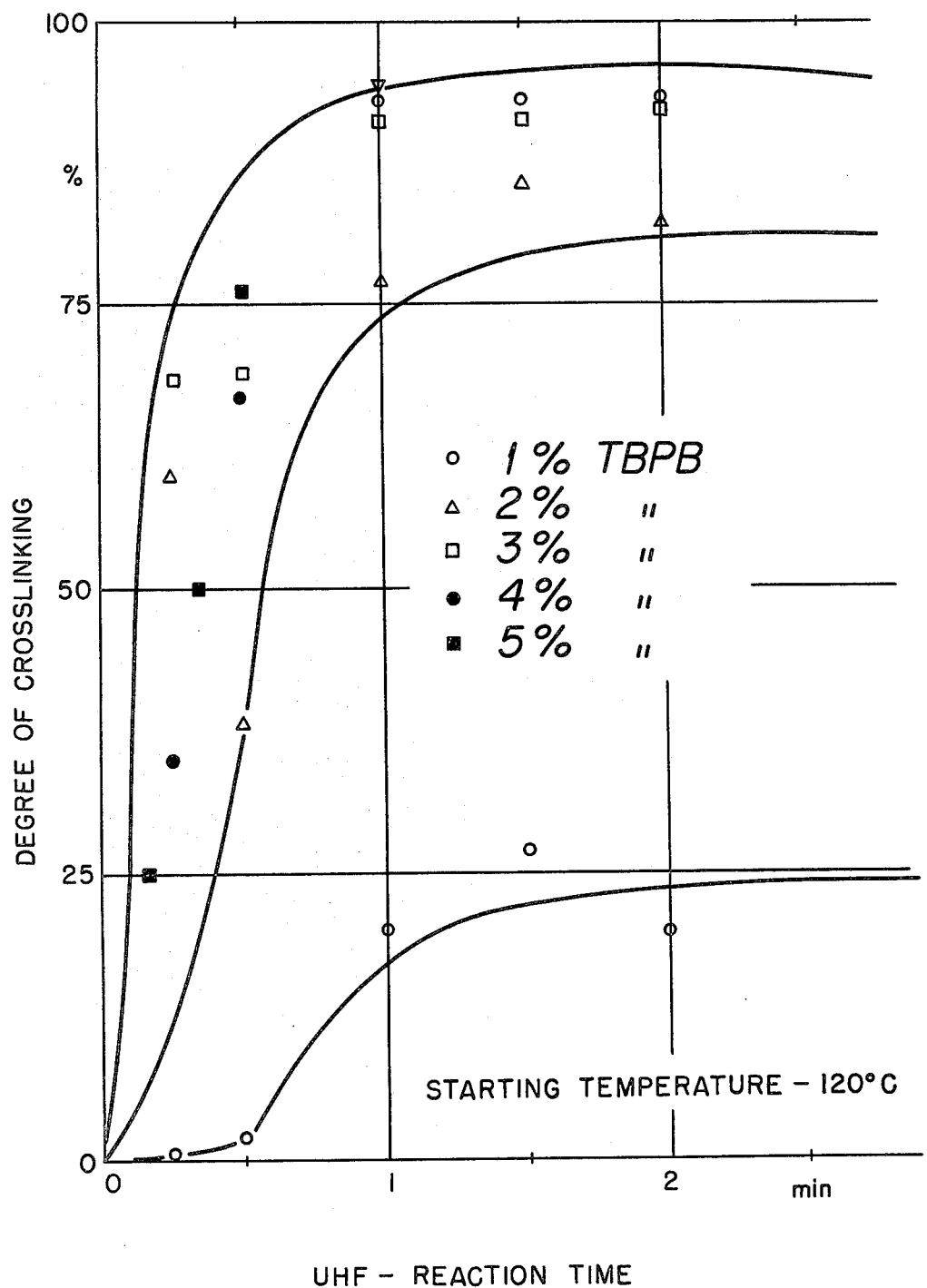
FIG. 4 is a graph illustrating the effect of using different percentages of crosslinking agent.
Figure 5A:
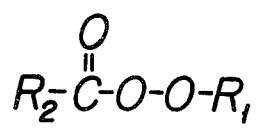
FIGS. 5a to 5f illustrate the structure of six crosslinking agents.
Figure 5B:
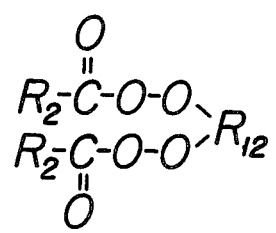
Figure 5C:
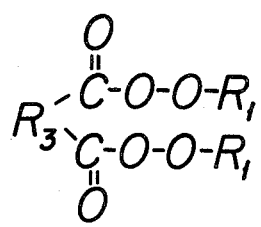
Figure 5D:
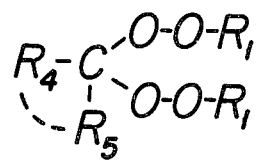
Figure 5E:
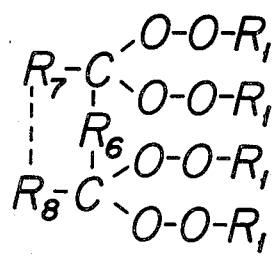
Figure 5F:
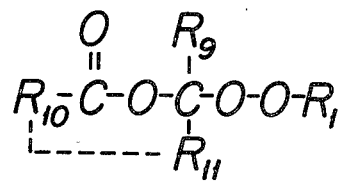

The composition of the mixture to be crosslinked comprising the polymer material (together with possible additives) and the crosslinking agent varies from 75 wt. % of polymer material and 25 wt.% of crosslinking agent to 99.9 wt. % of polymer material and 0.1 wt.% of crosslinking agent. Preferably the composition is between 92.5 wt. % of polymer material and 7.5 wt. % of crosslinking agent and 99.5 wt. % of polymer material and 0.5 wt. % of crosslinking agent. FIG. 4 illustrates graphically the effect of variation of the percentage of crosslinking agent (TBPB) with respect to the time required for crosslinking and the degree of crosslinking achieved. It will be seen that with 3% of TBPB, a high percentage of crosslinking is obtained in two minutes.

In the production of the mixture of polymer material and crosslinking agent in the form of t-butylperbenzoate, consideration must be given that the crosslinking agent is introduced slowly into the material to be crosslinked up to the predetermined concentration limit. To produce the mixture, it is sufficient to combine the components by thorough mixing for example in a rotary mixer. In order to expedite this process, the mixing is carried out at the highest temperature possible. In general mixing can be carried out at all temperatures below 105° C. and in particular at temperatures between room temperature and 100° C.

The time required for the mixing operation depends on the temperature, the method of mixing used and on the size and dimensions of the particles of polymer material. In the upper range of temperature, the mixing time is limited by the decomposition of the peroxide. The upper limit of the mixing time is the time during which through premature decomposition of the peroxide a crosslinking of the polymer material occurs so that problem-free further working of the material is no longer possible. A lower time limit is that in which the crosslinked polymer material is unevenly crosslinked owing to the nonhomogeneous distribution of the crosslinking agent. When using polyethylene and ethylene-propylene-rubber with t-butyl-perbenzoate as the crosslinking agent, the mixing time is preferably 10 to 60 seconds at 3000 RPM and 25°-80° C. Forming the material with the help of a screw extruder makes possible further homogenization of the mixture of polymer material and crosslinking agent. In particular through the use of a mixing part in the screw extruder, a good homogeneous mixture is obtained.

The forming of the material can be carried out through all known methods. Forming by means of a screw extruder requires temperatures which permits an extrusion of the mixture of polymer material and crosslinking agent, i.e. the polymer material must be in melt condition at the nozzle exit. Thereby it is to be considered that the small portion of crosslinking agent can reduce only insignificantly the melt temperature of the polymer material. The lower limit of melt temperature is a function not only of the kind of polymer but also of other parameters such as molecular weight, the kind and degree of branching, taxizitate, purity with respect to contaminants. The upper limit is given through the thermal decomposition of the crosslinking agent.

In the case of t-butylperbenzoate there is an upper temperature limit of 150° C. as at this temperature the peroxide already has a half-life period of about 9 minutes. A problem-free working of polyethylene is for example possible in the temperature range of 50° C. to 120° C.

For the crosslinking of polymer materials in accordance with the invention, an ultra-high frequency alternating current electric field with a frequency of 2450 MHz and a field strength of 1-100,000 watts and in particular 10-10,000 watts can be used. A UHF generator having a frequency of 2450 MHz and a nominal rating of 1.3 to 2.1 kw has been found to be satisfactory in carrying out the process of the present invention.

The time during which the material to be crosslinked is subjected to the ultra-high frequency electric field ranges between 1 second and 10 hours and in particular between 5 and 600 seconds. The time required for crosslinking of the polymer material by the ultrahigh frequency electric field depends on the nature of the material to be crosslinked, the temperature of the material at the beginning of the crosslinking process and the concentration of the crosslinking agent as well as the oven efficiency.

The required temperature of the mass does not have a lower limit. The upper limit is determined by the abovementioned thermal stability of the crosslinking agent. For crosslinking of polyethylene with t-butylperbenzoate, the mass temperature should be below 150° C. at the beginning of the crosslinking process in the ultrahigh electric field, in particular between 0° C. and 125° C. A higher mass temperature permits a shorter crosslinking time.

While t-butylperbenzoate has been given as an example of a crosslinking agent that can be used especially for crosslinking polyethylene, other crosslinking agents can be used provided that they have the characteristics of being activated by a UHF field to produce radicals for effecting the crosslinking process and are decomposed or converted into a decomposition or reaction product which is not excitable by an alternating current electric field. Radical donors which by their crosslinking ability, temperature stability and excitability in a UHF field fall in the chemical groups of:

(a) Perester
(b) Perketals
(c) Peroxide

The general structure form of such substances can be seen in FIGS. 5a to 5f. The organic radicals designated "R" can be an alkyl-, aryl- or Aralkyl-compound in one of the groups (a)–(c) above. Also alkalis come into question.

Parts of these substances can be specially modified, for example through inclusion of methyl, vinyl or phenyl groups.

Out of these many substances, those should be selected that assure an outstanding process security and guarantee attaining sufficient crosslinking.

As a minimum, the degree of crosslinking should be 60% as shown by extraction tests. An excessive foam formation at normal pressures as a result of gas-producing decomposition products is a disadvantage. On the basis of extensive tests, the following substances can satisfactorily be used as crosslinking agents in carrying out the process of the invention:

(1) t-butylperoxide-3,5,5 trimethylhexanoate (Structure form, FIG. 5a)
(2) 2,5-di-benzoylperoxy-2,5 dimethylhexane (Structure form, FIG. 5b)
(3) di-tributyl peroxyterephthalate (Structure form, FIG. 5c), a peroxide which is distinguished by high temperature stability.
(4) 1, 1-di-tributylperoxy-3,5,5-trimethyl cyclohexane (Structure form, FIG. 5d)
(5) 2-methyl-2-cumylperoxy-5-ketotetrahydrofuran (Structure form, FIG. 5e)
(6) 3-tributylperoxy-3-phenylphthalide (Structure form, FIG. 5f)
(7) 3-t-butylperoxy-3 (p-chlorphenyl)phthalide (Structure form, FIG. 5f)

Some of these substances possess a multifunctional character, i.e. they have more than one peroxide group in a molecule, and are hence more effective as crosslinking agents.

These and other substances have been tested with 5 wt. % per 100% of polymer. However, tests have shown that with substances (3), (5) and (6), satisfactory crosslinking can be obtained with from 2 to 3 wt. %.

The carrying out of the process in accordance with the invention will now be illustrated by reference to the following examples without, however, limiting the scope of the invention.

EXAMPLE 1

1000 g of polyethylene and 50 g of t-butylperbenzoate were mixed together in a rotary mixer for 15 seconds at 3000 RPM. In order to assure uniform distribution of the additive in the polyethylene, the mixture was plasticized and homogenized in a single screw extruder. For this purpose the screw used was provided with a slotted disc mixing portion. During the extrusion process the screw speed and cylinder temperature were regulated so that the mean mass temperature at the nozzle exit was 120° C.

Immediately after this mixing process, a part of the extruded mass was heated in an ultrahigh frequency alternating current field with a frequency f=2.45 GHz and with a maximum power output of 2.1 kw. The temperature of the mass rose rapidly during the treatment in the high frequency field and reached 140° C. in 15 seconds whereby a crosslinking of 50% was reached, and 153° C. in 25 seconds whereby a crosslinking of more than 75% was reached.

EXAMPLE 2

1000 g of EP-rubber and 50 g of t-butylperbenzoate were mixed, plasticized and homogenized as in Example 1 but the mass temperature at the nozzle exit was 110° C. Subsequently, the formed mass was crosslinked as in Example 1.

After 30 seconds a mass temperature of 129° C. was measured and the degree of crosslinking at this time point was 52%. After one minute the temperature was 146° C. and the corresponding degree of crosslinking was 57%.

What is claimed is:

1. A process for making electrical insulators which comprises uniformly mixing an insulating and electrically inactive crosslinkable polymer material selected from the group consisting of plastic and synthetic rubber with a crosslinking agent which is excitable in an ultra-high frequency alternating current electromagnetic field to produce radicals for effecting crosslinking of said polymer material, and which by subjection to said field in the crosslinking process are decomposed or converted into a decomposition or reaction product which is not excitable by an alternating current electric field, forming said mixture into the form of the insulators to be produced, and thereafter subjecting said formed mixture to an ultra-high frequency alternating current electromagnetic field to activate said crosslinking agent to effect crosslinking of said polymer material and to decompose or convert said crosslinking agent to a decomposition or reaction product not excitable by an alternating current electric field, said crosslinking agent being selected from the group consisting of t-butylperbenzoate, t-butylperoxide-3,5,5 trimethylhexanoate, 2,5-di-benzoylperoxy-2,5 dimethylhexane, di-tributyl peroxyterephthalate, 1, 1-di-tributylperoxy-3,5,5-trimethyl cyclohexane, 2-methyl-2-cumylperoxy-5-ketotetrahydrofuran, 3-tributylperoxy-3-phenylphthalide and 3-t-butylperoxy-3 (p-chlorphenyl) phthalide, said mixture being free of electrically active material which retains its electrical activity after subjection to said field.

2. A process according to claim 2, in which said crosslinking agent is t-butylperbenzoate.

3. A process according to claim 2, in which said polymer material is polyethylene.

4. A process according to claim 2, in which said polymer material is ethylene-propylene rubber.

5. A process according to claim 1, in which the proportion of said polymer material to said crosslinking agent is between 92.5 wt. % of polymer material to 7.5 wt. % of crosslinking agent and 99.5 wt. % of polymer material to 0.5 wt. % of crosslinking agent.

6. A process according to claim 1, in which the temperature of said mixture prior to subjection to said electric field is kept below 150° C.

7. A process according to claim 6, in which the temperature of said mixture immediately before subjection to said electric field is between ambient temperature and 100° C.

8. A process according to claim 1, in which said mixture is formed by being extruded by a screw extruder having a mixing and homogenizing section and said formed extruded mixture directly after extrusion is passed through a UHF unit wherein it is subjected to said ultra-high frequency alternating current electromagnetic field.

9. A process according to claim 1, in which the field strength of said ultra-high frequency alternating current electromagnetic field is between 10 watts and 10,000 watts.

10. A process according to claim 9, in which said formed mixture is subjected to said ultra-high frequency alternating current electromagnetic field for a period of between 5 seconds and 10 minutes.

11. A process according to claim 1, in which said ultra-high frequency alternating current field has a frequency of the order of 2.45 GHz.

12. A process according to claim 8, in which said UHF unit is a cavity resonator.

13. A process according to claim 8, in which said UHF unit is a wave guide.

14. A process according to claim 1, in which said formed mixture is received in a cavity resonator in which it is subjected to said ultra-high frequency alternating current electromagnetic field.

15. A process according to claim 1, in which said formed mixture is received in a cavity resonator in which it is subjected to said ultra-high frequency alternating current electromagnetic field.

16. A process according to claim 1, in which the composition to be crosslinked is wholly nonpolar.

17. A process according to claim 1, in which the crosslinking of said polymer material is effected at a temperature below the softening point of said polymer material.

* * * * *